(12) United States Patent
Liu et al.

(10) Patent No.: US 11,811,297 B2
(45) Date of Patent: Nov. 7, 2023

(54) PHASE-SHIFT CONTROL METHOD FOR POWER MODULE, THREE-PHASE POWER MODULE, AND POWER SYSTEM

(71) Applicant: Delta Electronics (Shanghai) Co., Ltd., Shanghai (CN)

(72) Inventors: Hong Liu, Shanghai (CN); Jie Kong, Shanghai (CN); Wen Zhang, Shanghai (CN); Baihui Song, Shanghai (CN); Cheng Lu, Shanghai (CN); Hongyang Wu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 54 days.

(21) Appl. No.: 17/658,656

(22) Filed: Apr. 11, 2022

(65) Prior Publication Data
US 2022/0368235 A1    Nov. 17, 2022

(30) Foreign Application Priority Data

May 14, 2021   (CN) .......................... 202110529768.8

(51) Int. Cl.
*H02M 3/24* (2006.01)
*H02J 7/00* (2006.01)

(52) U.S. Cl.
CPC ............. *H02M 3/24* (2013.01); *H02J 7/0013* (2013.01); *H02J 2207/20* (2020.01)

(58) Field of Classification Search
CPC ...... H02J 2207/20; H02J 7/0013; H02M 3/24; H02M 3/285; H02M 3/22
See application file for complete search history.

(56) References Cited

U.S. PATENT DOCUMENTS 9,762,134 B2    9/2017   Deboy et al.
10,804,809 B1   10/2020  Yelaverthi et al.
(Continued)

FOREIGN PATENT DOCUMENTS

| CH | 708040 A2 | 11/2014 |
|---|---|---|
| CN | 202178709 | 3/2012 |
| JP | 2017077078 A | 4/2017 |

OTHER PUBLICATIONS

Bo Xue et al., "Phase-Shift Modulated Interleaved LLC Converter With Ultrawide Output Voltage Range", IEEE Transactions on Power Electronics, vol. 36, No. 1, Jan. 2021.

*Primary Examiner* — Nguyen Tran
(74) *Attorney, Agent, or Firm* — CKC & Partners Co., LLC

(57) ABSTRACT

A power module includes N inverter units outputting N AC voltages and being coupled to N high-frequency AC terminals, wherein the N high-frequency AC terminals are cascaded and connected to a post-stage rectifier circuit. A phase-shift control method for the power module includes: setting at least two phase-shift sequences, wherein phase sequence numbers of the N AC voltages of the N inverter units are different in the at least two phase-shift sequences; in one switching period, controlling the N AC voltages of the N inverter units to shift a first angle according to a first phase-shift sequence of the at least two phase-shift sequences; and in another switching period, controlling the N AC voltages of the N inverter units to shift the first angle according to a second phase-shift sequence of the at least two phase-shift sequences.

21 Claims, 12 Drawing Sheets

(56) References Cited

U.S. PATENT DOCUMENTS

| | | | |
|---|---|---|---|
| 2020/0235656 A1* | 7/2020 | Forouzesh | H02M 1/4258 |
| 2020/0244183 A1 | 7/2020 | Mihalache | |
| 2021/0257919 A1* | 8/2021 | Hayashi | H02M 3/1584 |
| 2022/0140739 A1* | 5/2022 | Liu | H02M 1/0074 |
| | | | 363/13 |

* cited by examiner

PHASE-SHIFT CONTROL METHOD FOR POWER MODULE, THREE-PHASE POWER MODULE, AND POWER SYSTEM

CROSS-REFERENCE TO RELATED APPLICATIONS

This non-provisional application claims priority under 35 U.S.C. § 119(a) on Patent Application No. 202110529768.8 filed in P.R. China on May 14, 2021, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to the power electronic technology, and particularly to a phase-shift control method for a power module, a three-phase power module, and a power system.

2. Related Art

Solid State Transformers (SSTs) have a wide application prospect in fields of DC power utilization or generation such as data centers, electric vehicle charging stations, photovoltaic, and energy storage. In these application scenarios, it is always required output voltages with wide ranges.

For example, the requirements of the data centers for power voltages are Telecom 240V (200-290V), Mobile 336V (280-400V), future 750V (625-900V), and the like. The range of charging voltages of batteries at the electric vehicle charging stations is 200V-500V or 200V-1000V.

Moreover, as electric energy conversion systems, it is often desired that the SSTs have higher efficiency. Since most of the SSTs have high voltage inputs and use modular structures, it is often desired that powers among the modules are balanced to facilitate the consistent design of the system.

FIG. 1 illustrates a specific topological diagram of the conventional three-phase solid-state-transformer (SST) 100' based on single-phase modules. The SST 100' consists of three single-phase converters for phase A, phase B, and phase C, each phase comprising N cells 10'. Taking phase A as an example, it comprises N cells 10' of Cell 1A to Cell NA. Each cell 10' may comprise a pre-stage H-bridge circuit 11' (e.g., an AC-DC circuit) and a post-stage DC-DC isolation circuit 12' (most are LLC circuits). The N cells 10' of each phase are in Input Series Output Parallel (ISOP) type with, for example, input sides being Cascaded H-Bridge (CHB), and output sides being LLC isolation circuits connected in parallel. All outputs of the three phases are connected in parallel to form a general low voltage DC bus (BUS). In the embodiment of FIG. 1, the output of voltage within a wide range can be realized through phase-shift control at post-stage primary and secondary sides (voltage increasing) and control of a duty cycle at the primary side (voltage decreasing).

As can be seen from FIG. 1, the conventional topology includes 3*N cells, and the number of cells is numerous, which increases the difficulty in designing the structure of the system and does not facilitate the integration of the system. When the system is further developed to high voltage, the number of cells gets bigger, i.e., increased by a multiple of 3, which does not facilitate further expansion. Each cell processes a single-phase power, and the power has double frequency fluctuation, arising fluctuation of corresponding DC-link (shown by a dark black region in FIG. 1) voltages, or double frequency fluctuation of currents in an LLC resonant cavity. Even if the LLC circuits use control loops for inhibiting fluctuation of the power, it is still difficult to inhibit double frequency fluctuation of currents in the LLC resonant cavity, causing additional loss of the LLC circuits. Moreover, it is hard for the three-phase LLC circuits to share the currents, and the powers of the cells shall be balanced using a complex voltage-sharing current-sharing algorithm. Meanwhile, the schemes of the LLC circuits for adjusting the output voltages are extremely limited. Frequency modulation, phase shifting, or duty cycle regulation may be adopted, but frequency modulation affects the efficiency of the system, and phase shifting or duty cycle regulation results in the loss of Zero Voltage Switch (ZVS) of inverter circuits at the primary side of the LLC circuits, thereby increasing loss.

With respect to a topology of the post-stage LLC circuits, the patent U.S. Pat. No. 10,804,809 B1 provides a high-frequency cascade converter, wherein high-frequency AC terminals of the respective LLCs, i.e., secondary sides of the transformer, are connected to an AC-DC circuit for outputting after high-frequency cascade connection. Similar to a voltage modulation method for the single-phase cells of the SST, the output of voltages within a wide range can be realized through phase-shift control between AC voltages at primary and secondary sides (voltage increasing) and control of a duty cycle at the primary side (voltage decreasing), but the case where ZVS is lost when outputting within a wide range also exists, which affects the efficiency of the system.

In addition, document [1] (Bo Xue, etc, Shift Modulated Interleaved LLC Converter With Ultrawide Output Voltage Range, IEEE TRANSACTIONS ON POWER ELECTRONICS, VOL. 36, NO. 1, 2021) discloses a high-frequency cascade converter, wherein secondary sides of the two LLC transformers are cascaded and then connected to an AC-DC circuit for outputting, and output voltage regulation control is performed through phase shifting between two primary high-frequency voltages using phase-shift voltage regulation between AC voltages of the primary inverter units. The primary inverters of such structures do not easily lose ZVS, and efficiency is relatively high. However, being a single-phase cell, it has two resonant cavities and two resonant circuits, resulting in a relatively high cost.

SUMMARY OF THE INVENTION

An object of the invention is to provide a phase-shift control method for a power module, a three-phase power module, and a power system, which can solve one or more deficiencies of the prior art.

To realize the above object, according to one embodiment of the invention, the invention provides a phase-shift control method for a power module, wherein the power module comprises N inverter units outputting N AC voltages and being coupled to N high-frequency AC terminals respectively, where N is a positive integer equal to or greater than 3, and wherein the N high-frequency AC terminals are cascaded and then connected to a post-stage rectifier circuit. The phase-shift control method comprises: setting at least two phase-shift sequences, wherein phase sequence numbers of the N AC voltages of the N inverter units are different in the at least two phase-shift sequences; in one switching period, controlling the N AC voltages of the N inverter units to phase shift a first angle with each other according to a first phase-shift sequence of the at least two phase-shift sequences; and in another switching period, controlling the N AC voltages of the N inverter units to phase shift the first angle with each other according to a second phase-shift sequence of the at least two phase-shift sequences.

To realize the above object, the invention further provides a three-phase power module, comprising: three pre-stage single-phase rectifier circuits having AC terminals electrically coupled to a three-phase AC power supply; three intermediate DC bus capacitors; three inverter units outputting three AC voltages, with the pre-stage rectifier circuits being connected to the inverter units in one-to-one correspondence through the intermediate DC bus capacitors; three high-frequency AC terminals coupled to the three inverter units respectively; a post-stage rectifier circuit connected to the three high-frequency AC terminals cascaded; and a controller configured to perform phase-shift control, which comprises: setting at least two phase-shift sequences, wherein phase sequence numbers of the three AC voltages of the three inverter units are different in the at least two phase-shift sequences; in one switching period, controlling the three AC voltages of the three inverter units to phase shift a first angle with each other according to a first phase-shift sequence of the at least two phase-shift sequences; and in another switching period, controlling the three AC voltages of the three inverter units to phase shift the first angle with each other according to a second phase-shift sequence of the at least two phase-shift sequences.

To realize the above object, the invention further provides a power system, comprising: at least two three-phase power modules.

The invention provides an alternative phase-shift control method applied to high-frequency cascaded modules, which realizes high-efficiency output and power-sharing control within a wide range. The invention can inhibit double frequency fluctuation of the DC-Link voltage by injecting a zero-sequence voltage through the pre-stage AC-DC differential mode voltage controller.

The invention further provides an isolating three-phase power module, which can offset double frequency fluctuation in a secondary voltage and eliminate the imbalance of currents in a three-phase resonant tank through a high-frequency cascade connection of the three phases.

The invention further provides an SST based on the three-phase isolating three-phase power module, each power module comprises a controller, and the controllers are connected by communication lines, thereby reducing the number of modules and the number of controllers.

The additional aspects and advantages of the invention are partially explained in the below description, and partially becoming apparent from the description, or can be obtained through the practice of the invention.

BRIEF DESCRIPTION OF THE DRAWINGS

The exemplary embodiments are described in detail with reference to the accompanying drawings, through which the above and other features and advantages of the invention will become more apparent.

DETAILED EMBODIMENTS OF THE INVENTION

Figure 1:
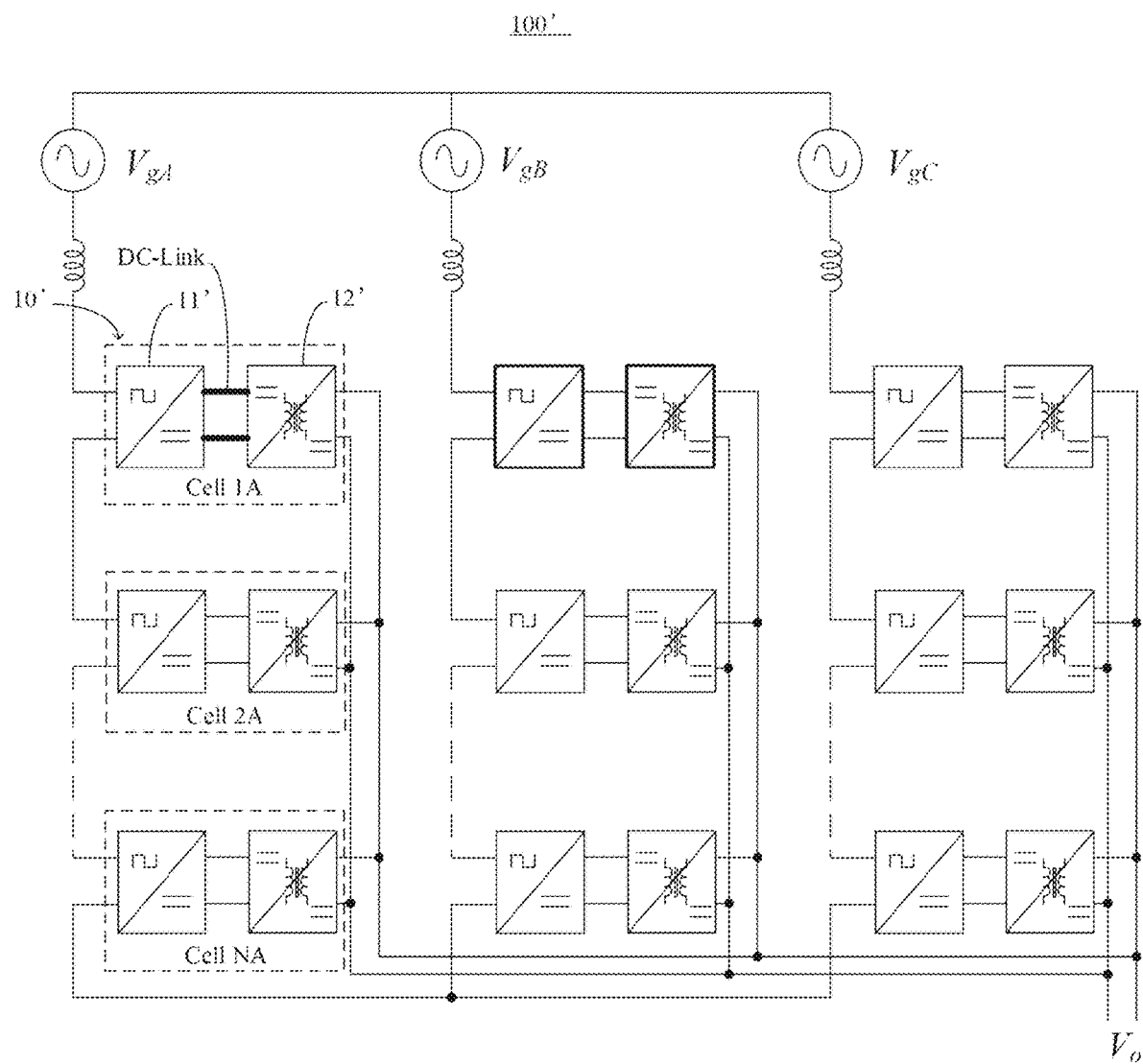
FIG. 1 is a topological diagram of a conventional three-phase Solid-State-Transformer (SST) based on single-phase modules.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

In combination with the advantages of the conventional high-frequency cascade converter, the invention provides a phase-shift control method applied to a high-frequency cascaded power module. Hereinafter the phase-shift control method is explained by taking the high-frequency cascaded power module in FIG. 2 as an example.

Figure 2:
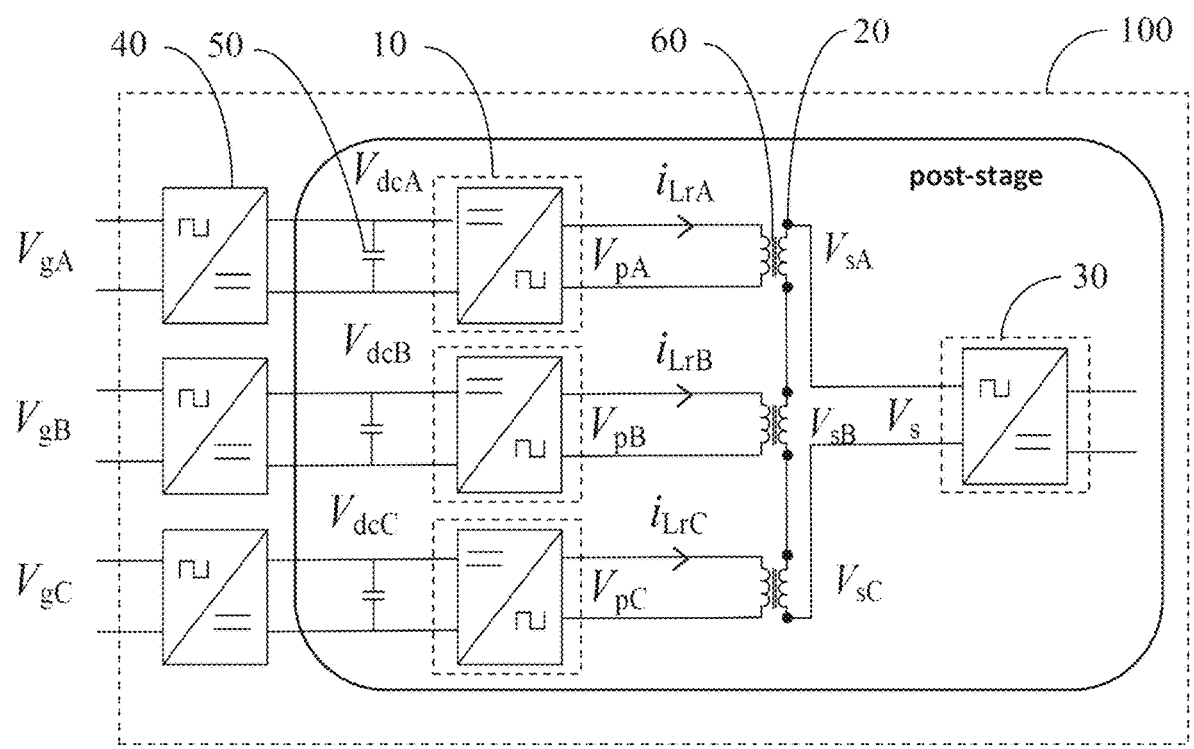
FIG. 2 is a topological diagram of a three-phase power module according to the first embodiment of the invention.

As shown in FIG. 2, a power module 100 of the invention may comprise N inverter units 10, where N is a positive integer equal to or greater than 3. Moreover, the N inverter units 10 may output N AC voltages (such as, $V_{pA}$, $V_{pB}$, and $V_{pC}$, but the invention is not limited thereto) respectively and are coupled to N high-frequency AC terminals 20 respectively, which are cascaded and connected to a post-stage rectifier circuit 30. The power module 100 may further comprise a controller (not shown) configured to perform phase-shift control, for example, to execute a phase-shift control method shown in FIG. 3.

Figure 3:
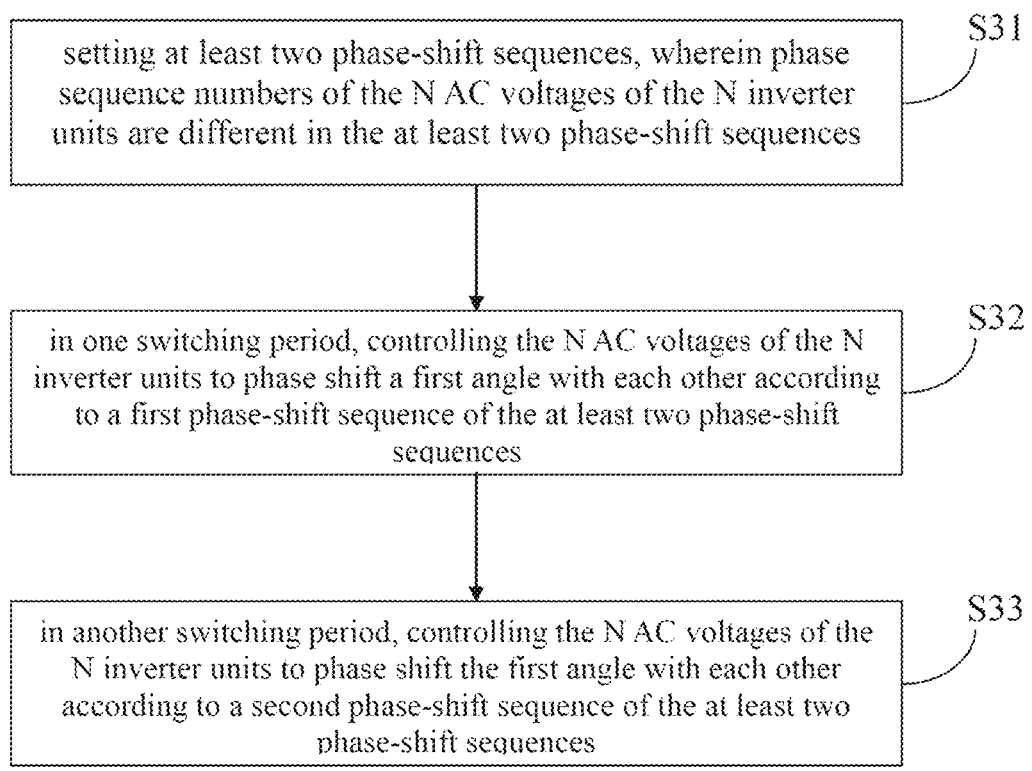
FIG. 3 is a flow diagram of a phase-shift control method for a power module according to the invention.
Figure 4:
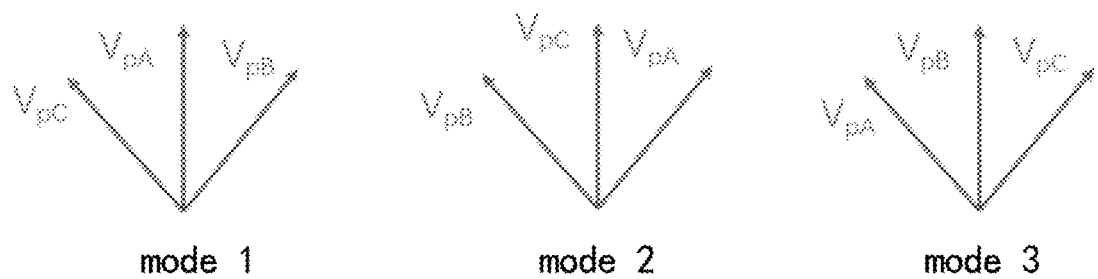
FIG. 4 illustrates three phase-shift control modes in the phase-shift control method of the invention based on the three-phase power module of FIG. 2, wherein each control mode corresponds to a phase-shift control sequence.

Referring to FIGS. 2 and 4, as shown in FIG. 3, the phase-shift control method for a power device in the invention mainly comprises:

step S31, setting at least two phase-shift sequences (e.g., three phase-shift sequences corresponding to three control modes in FIG. 4, but the invention is not limited thereto), wherein the phase sequence numbers of the N AC voltages (such as $V_{pA}$, $V_{pB}$, and $V_{pC}$, but the invention is not limited thereto) of the N inverter units 10 are different in the at least two phase-shift sequences;

step S32, in one switching period, controlling the N AC voltages (such as $V_{pA}$, $V_{pB}$, and $V_{pC}$) of the N inverter units 10 to phase shift a first angle with each other according to a first phase-shift sequence of the at least two phase-shift sequences (such as one of the three control modes in FIG. 4); and step S33, in another switching period, controlling the N AC voltages (such as $V_{pA}$, $V_{pB}$, and $V_{pC}$) of the N inverter units 10 to phase shift the first angle with each other according to a second phase-shift sequence of the at least two phase-shift sequences (such as another one of the three control modes in FIG. 4).

In the invention, each phase-shift sequence lasts at least m switching periods, where m is a positive integer. Preferably, during phase-shift control, for example, N phase-shift sequences may be set, and the controller may control the N AC voltages of the N inverter units to phase shift with each other sequentially and alternatively according to the N phase-shift sequences. Moreover, the phase sequence numbers of each inverter unit are different in the N phase-shift sequences.

In the embodiment of FIG. 2, N is equal to 3, i.e., a three-phase power module 100 is provided. However, it can be understood that in other embodiments, N may also be other numbers, and the invention is not limited thereto.

More specifically, the three-phase power module 100 of FIG. 2 comprises three inverter units 10, three high-frequency AC terminals 20, a post-stage rectifier circuit 30, three pre-stage single-phase rectifier circuits 40, there intermediate DC bus capacitors 50 (i.e., DC-link), and a controller (not shown). AC terminals of the three pre-stage single-phase rectifier circuits 40 are electrically coupled to a three-phase AC power supply, which may supply voltages $V_{gA}$, $V_{gB}$, and $V_{gC}$, respectively. The three inverter units 10 output three AC voltages, such as $V_{pA}$, $V_{pB}$, and $V_{pC}$, the three pre-stage single-phase rectifier circuits 40 are connected to the inverter units 10 in one-to-one correspondence through one intermediate DC bus capacitor 50 respectively, and input voltages at DC sides of the three inverter units 10 are $V_{dcA}$, $V_{dcB}$, and $V_{dcC}$. The three high-frequency AC terminals 20 are coupled to the three inverter units 10 respectively. The post-stage rectifier circuit 30 is connected to the three high-frequency AC terminals 20 cascaded. The controller (not shown) may be configured to perform phase-shift control, for example, to execute the phase-shift control method shown in FIG. 3.

Preferably, the three-phase power module 100 may further comprise three isolation transformers 60 disposed between the three inverter units 10 and the three high-frequency AC terminals 20 respectively, thereby forming a three-phase high-frequency cascaded and isolating power module. In the embodiment of FIG. 2, each of the isolation transformers 60 comprises one primary winding connected to the inverter unit 10 respectively, and one secondary winding connected to the high-frequency AC terminal 20 respectively.

Preferably, the three pre-stage single-phase rectifier circuits 40 may be single-phase AC-DC circuits. The three high-frequency AC terminals 20 may be output terminals of the secondary windings of the isolation transformers 60 and may have voltages $V_{sA}$, $V_{sB}$, and $V_{sC}$, respectively. The three high-frequency AC terminals 20 (i.e., the output terminals of the secondary windings of the three isolation transformers 60) are cascaded and connected to the post-stage rectifier circuit 30.

In this embodiment, when performing phase-shift control, the three-phase power module 100 performs alternative phase-shift control on the AC voltages ($V_{pA}$, $V_{pB}$, and $V_{pC}$) at primary sides of the three isolation transformers 60 through the controller. When performing phase-shift control, for example, the controller of the three-phase power module 100 sets three phase-shift sequences and controls the three AC voltages of the three inverter units to phase shift with each other sequentially and alternatively according to the three phase-shift sequences. The three-phase power module 100 in FIG. 2 has three AC voltages $V_{pA}$, $V_{pB}$, and $V_{pC}$ at primary sides, and uses three phase-shift control modes, such as mode 1, mode 2, and mode 3 shown in FIG. 4, which correspond to one phase-shift control sequence, respectively. Specifically, as shown in FIG. 4, in mode 1, $V_{pA}$ lags $V_{pC}$ by a first angle, and $V_{pB}$ lags $V_{pA}$ by the first angle; in mode 2, $V_{pC}$ lags $V_{pB}$ by the first angle, and $V_{pA}$ lags $V_{pC}$ by the first angle; in the mode 3, $V_{pB}$ lags $V_{pA}$ by the first angle, and $V_{pC}$ lags $V_{pB}$ by the first angle. Therefore, the phase sequence numbers of the AC voltages $V_{pA}$, $V_{pB}$, and $V_{pC}$ at each primary side are different in the three phase-shift control modes, and the three AC voltages $V_{pA}$, $V_{pB}$, and $V_{pC}$ at the primary sides in each mode sequentially lag by a respective angle. The duration of each mode (i.e., the phase-shift sequence) may be at least m (m≥1) switching periods. In the 3*m switching periods, the three phase-shift control modes may be alternated sequentially. Here, the switching periods may, for example, refer to switching periods of the inverter units 10 at the primary sides, i.e., periods of the high-frequency AC voltages $V_{pA}$, $V_{pB}$, and $V_{pC}$ at the primary sides. The alternative phase-shift control method in this embodiment can be applied to N high-frequency cascade converters.

Figure 5:
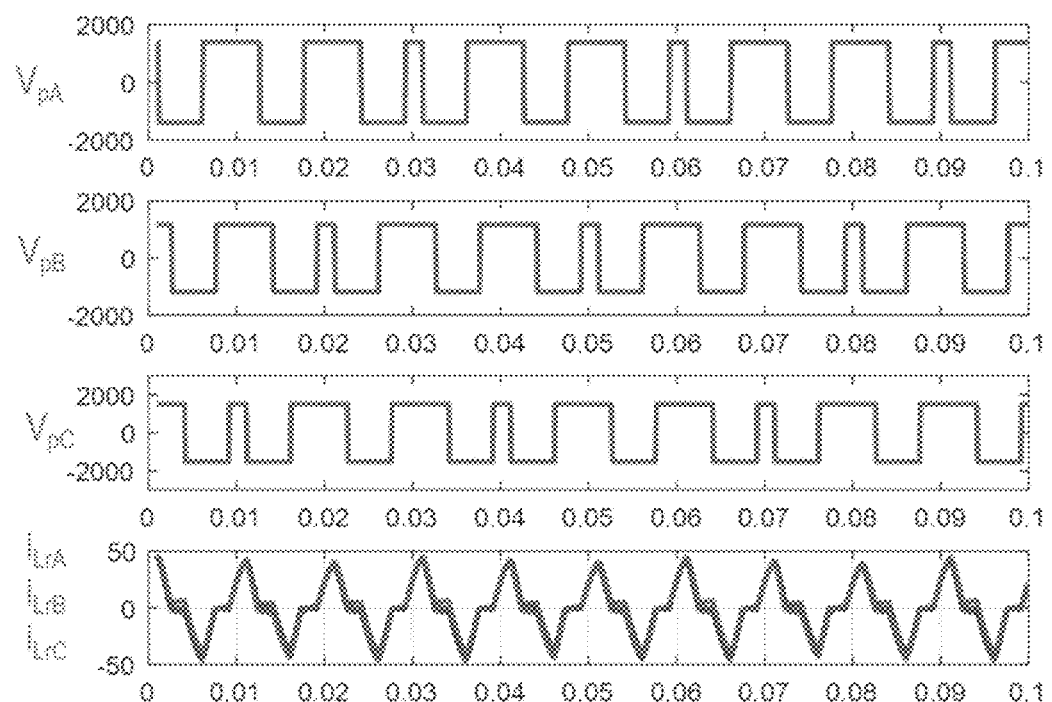
FIG. 5 illustrates a schematic diagram of simulation waveforms of the alternative phase-shift control method used in the invention.

Simulation waveforms using the alternative phase-shift control method are shown in FIG. 5. In FIG. 5, the phase-shift control mode is alternated once every other switching period. Through alternative phase-shift control, in every three switching periods, effective values of input currents $i_{LrA}$, $i_{LrB}$, and $i_{LrC}$ are substantially equal, and input powers are equal when the input voltages $V_{dcA}$, $V_{dcB}$, and $V_{dcC}$ of the three inverter units 10 are equal. As can be seen, the invention can realize the balance of powers among the three phases of the three-phase power module through open-loop alternative phase-shift control without designing a closed-loop controller, so it may be implemented simply.

Further, alternative phase-shift in the invention may also alternate with some of the modes. For example, the alternation may be performed by adopting only modes 1 and 2 in FIG. 4, which may also realize the balance of powers among the three phases to a certain extent.

Figure 6:
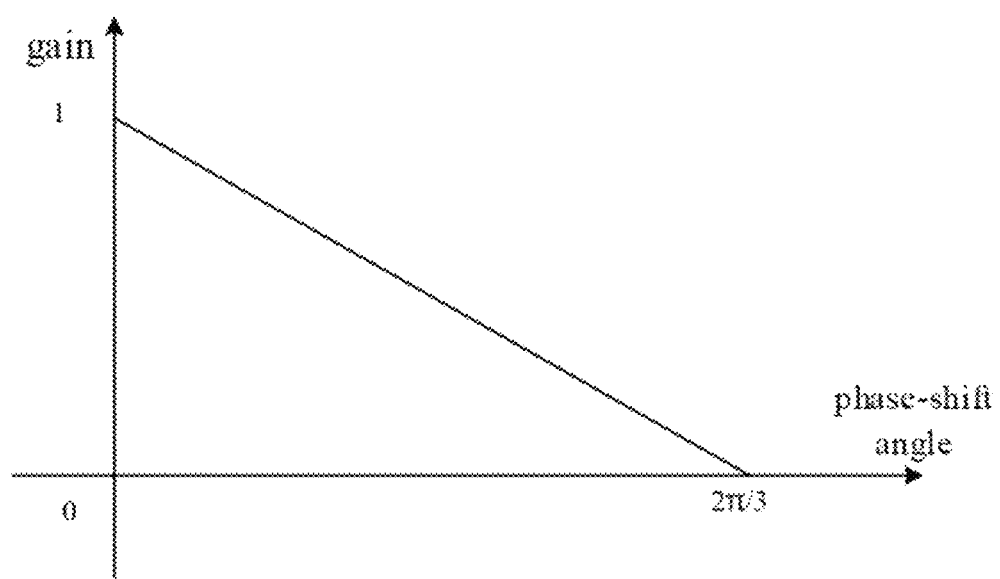
FIG. 6 illustrates a schematic diagram of the relation between a phase-shift angle and a gain in the phase-shift control method of the invention.

FIG. 6 illustrates the relation between a phase-shift angle and a gain in the phase-shift control method of the invention. As can be seen from FIG. 6, with an increasing of the phase-shift angle, the gain is reduced gradually, thereby realizing control of output voltages within a wide range. Moreover, in the invention, the larger the first angle phase-shifted, the smaller the output voltage of the post-stage rectifier circuit. Although the phase-shift angle changes linearly with the gain as shown in FIG. 6, the relationship may not be completely linear in practice and may be, for example, approximate to the linear relation. Furthermore, the first angle may be configured according to actual needs, and the invention is not limited thereto.

Through the phase-shift control method of the invention, a voltage output in a wide range can be realized, ZVS may not be lost easily, efficiency is substantially not affected by voltage regulation, and efficiency of the system is relatively high. Moreover, in the three-phase power module of the invention, primary currents of the three phases are completely consistent, so that there is not double frequency power fluctuation in secondary currents, it is unnecessary to take any measures to inhibit double frequency power at the post-stage, and there is not double frequency power fluctuation in the post-stage DC-DC isolation circuit, thereby improving the efficiency of the post-stage.

Figure 7:
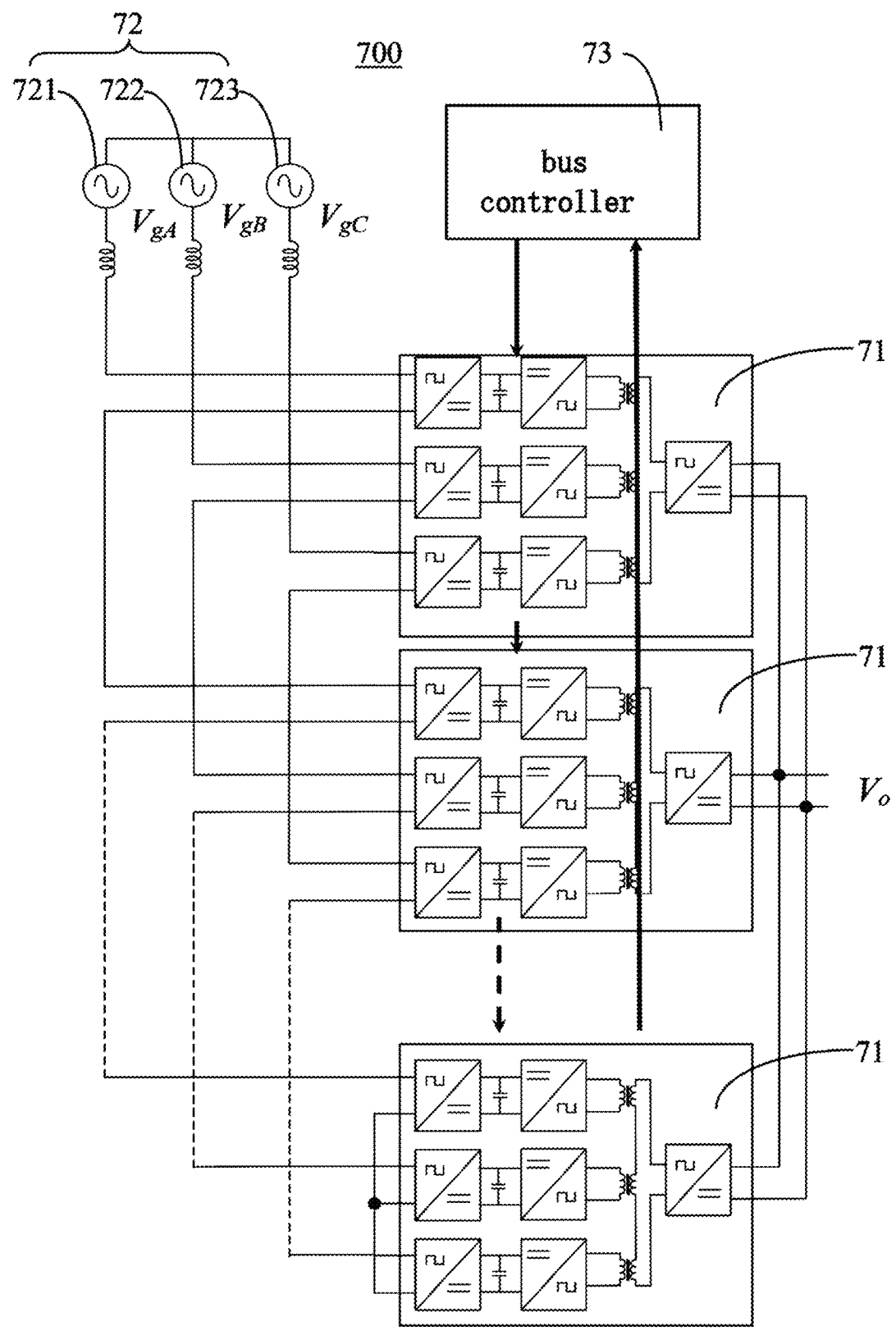
FIG. 7 is a structural diagram of a three-phase power system based on a three-phase power module according to the invention.

FIG. 7 illustrates a structure of a three-phase power system 700 based on a three-phase power module according to the invention. The three-phase power system 700 comprises three three-phase power modules 71, and AC sides of the respective pre-stage rectifier circuits of which are cascaded and then connected to a three-phase AC power supply 72. The three-phase AC power supply 72, for example, may be a three-phase power grid comprising a phase A 721, a phase B 722 and a phase C 723, wherein the phase A 721, the phase B 722 and the phase C 723 may have voltages $V_{gA}$, $V_{gB}$, and $V_{gC}$, respectively. In the embodiment of FIG. 7, each of the three-phase power modules 71, for example, may be a three-phase high-frequency cascaded and isolating power module shown in FIG. 2, and may further form a new SST topology through cascade connection of respective phases of the modules.

In the embodiment of FIG. 7, inputs of the three phases of the three three-phase power modules 71 may be connected to a three-phase power grid after being cascaded, and outputs of all three-phase power modules 71 are connected in parallel. Each of the three-phase power modules 71 may comprise a controller (not shown), and the three-phase power system 700 further comprises a bus controller 73 mainly serving as a general monitoring unit. The controllers of the respective three-phase power modules 71 are connected via communication lines and the three phases may be in a Y connection or an delta connection. As compared to the conventional SST, the number of modules is decreased in the invention, while communication loops and the number of controllers are decreased. Moreover, the modules of the three phases have been coordinated inside without additional communication lines among the three phases, such that the complexity of coordination among the three phases of the system is reduced.

Each phase of the three-phase isolating module in the prior art shall process a single-phase power, which has double frequency fluctuation, causing voltage fluctuation on the respective DC-link (i.e., $V_{dcA}$, $V_{dcB}$, and $V_{dcC}$ in FIG. 2) or power fluctuation in the post-stage DC-DC isolation circuit. In the invention, since the three-phase power modules are in a high-frequency cascade connection, there is no double frequency current in the post-stage DC-DC isolation circuit, and double frequency power fluctuation may be absorbed by the DC-Link, thereby avoiding the adverse effect of the double frequency power on efficiency of the post-stage. When all double frequency powers are on the DC-Link, the DC-Link voltage results a large double frequency fluctuation, causing overvoltage or undervoltage of the DC-Link voltage. When the DC-Link voltage is an undervoltage, a modulation ratio of the pre-stage AC-DC circuits may be too high (the modulation ratio must be less than 1), such that normal operation at the pre-stage is impossible; and when the DC-Link voltage is an overvoltage, devices in the circuit may be damaged due to overvoltage. Therefore, the high-frequency cascaded and isolating three-phase power module of the invention may further perform interphase voltage-sharing control on the pre-stage output voltage at the pre-stage, thereby inhibiting the influence of the double frequency power on the fluctuation of the DC-Link voltages.

Figure 8:
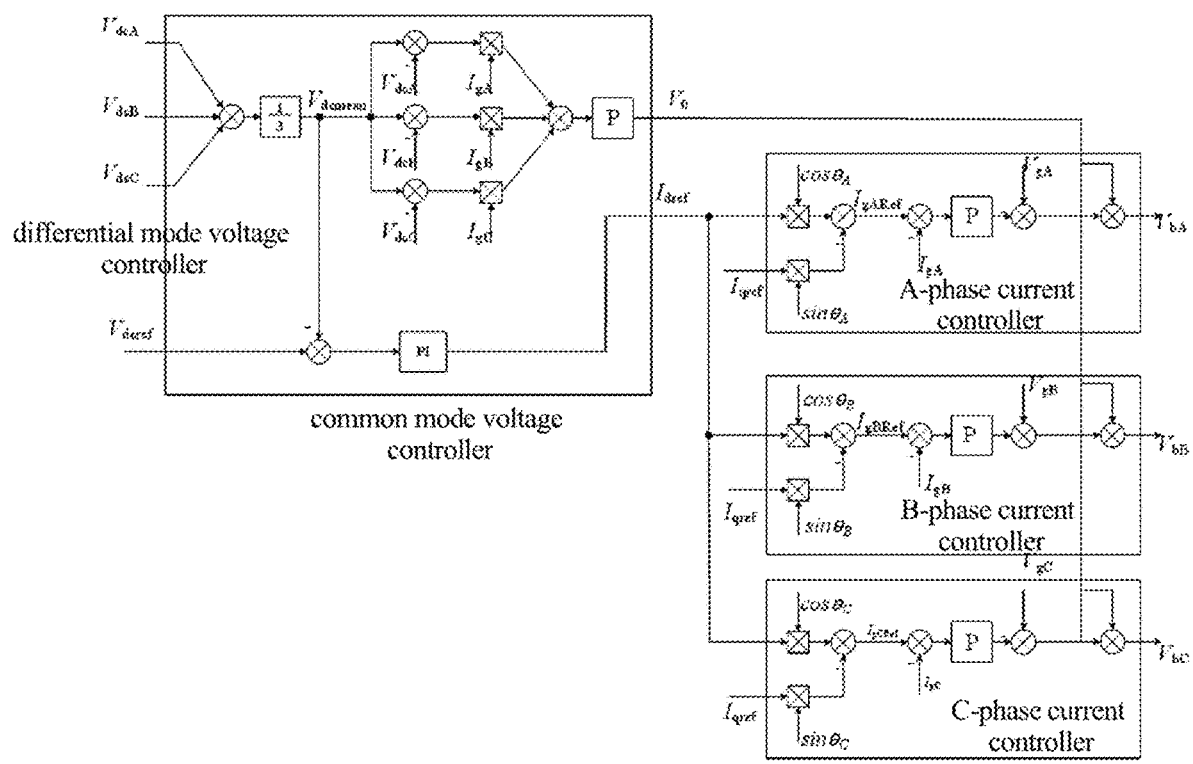
FIG. 8 is a block diagram of performing interphase voltage-sharing control on a pre-stage output voltage in the three-phase power system of the invention.

FIG. 8 illustrates a block diagram of performing interphase voltage-sharing control in a pre-stage rectifier circuit of the invention. $\theta_A$, $\theta_B$, and $\theta_C$ are phases of AC inputs $V_{gA}$, $V_{gB}$, and $V_{gC}$, respectively, and $V_{bA}$, $V_{bB}$, and $V_{bC}$ are input voltages on bridge arms of the pre-stage single-phase rectifier circuit. "Common mode voltage controller" marked in FIG. 8 controls an average DC-Link voltage of the three phases, and usually adopts proportional integral (PI) control, and phases of the power grid voltages of the respective phases are multiplied by an output of the controller as instructions for current controllers of the respective phases. "Differential mode voltage controller" marked in FIG. 8 is a partially interphase voltage-sharing control loop and generates a zero-sequence voltage $V_0$ through controlling, thereby inhibiting double frequency fluctuation of the DC-Link voltages, and a control effect diagram is shown in FIG. 9B.

Figure 9A:
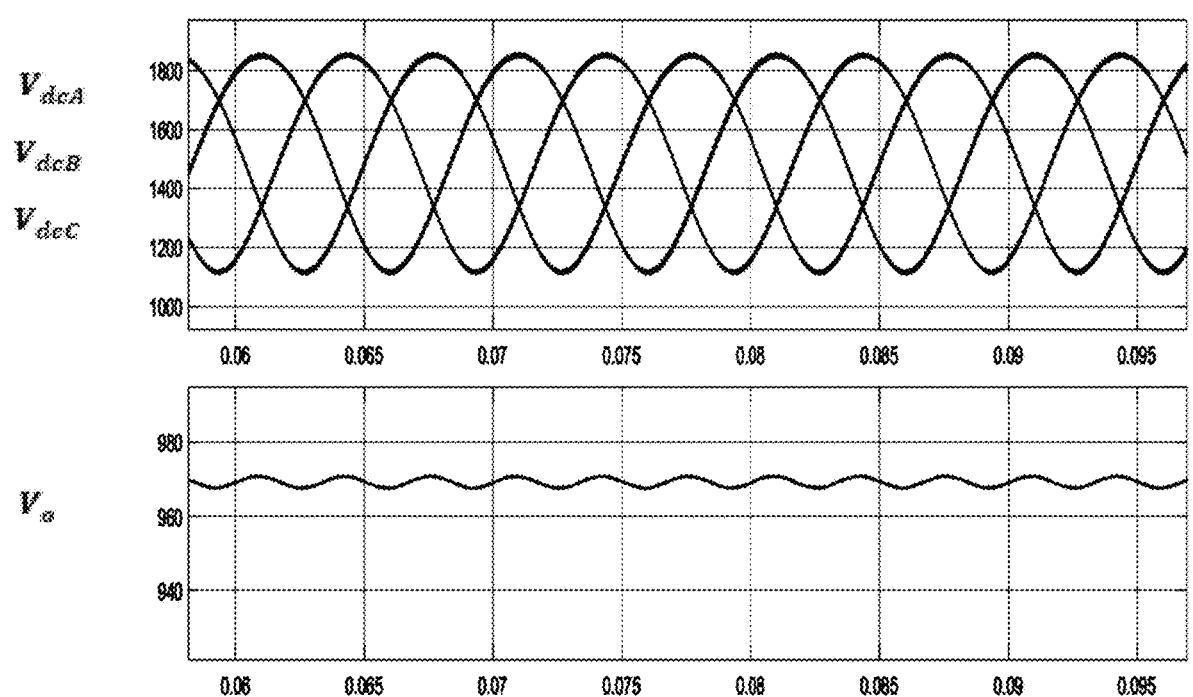
FIG. 9A is a diagram of waveforms when interphase voltage-sharing control is not performed in a pre-stage rectifier circuit of the invention.
Figure 9B:
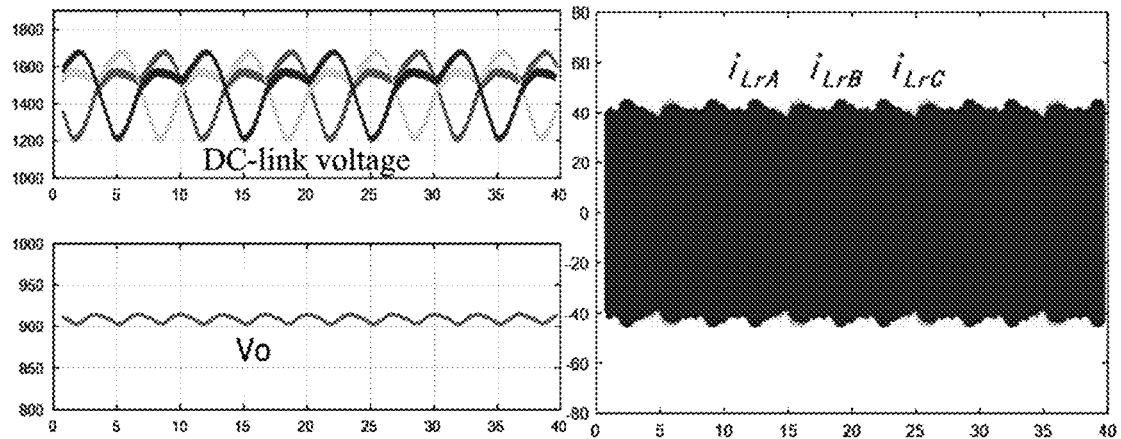
FIG. 9B is a diagram of waveforms when interphase voltage-sharing control is performed in the pre-stage rectifier circuit of the invention.

FIGS. 9A and 9B illustrate waveforms of the fluctuating DC-Link voltage when interphase voltage-sharing control is not performed and performed in a pre-stage rectifier circuit, respectively. By comparing between FIGS. 9A and 9B, it is evident that after interphase voltage-sharing control is performed, although double frequency powers are absorbed by the DC-Link, a peak of double frequency fluctuation of the DC-Link voltage in FIG. 9B is obviously decreased, while a valley value is substantially unchanged, so that the normal operation of the system is not affected.

Figure 10:
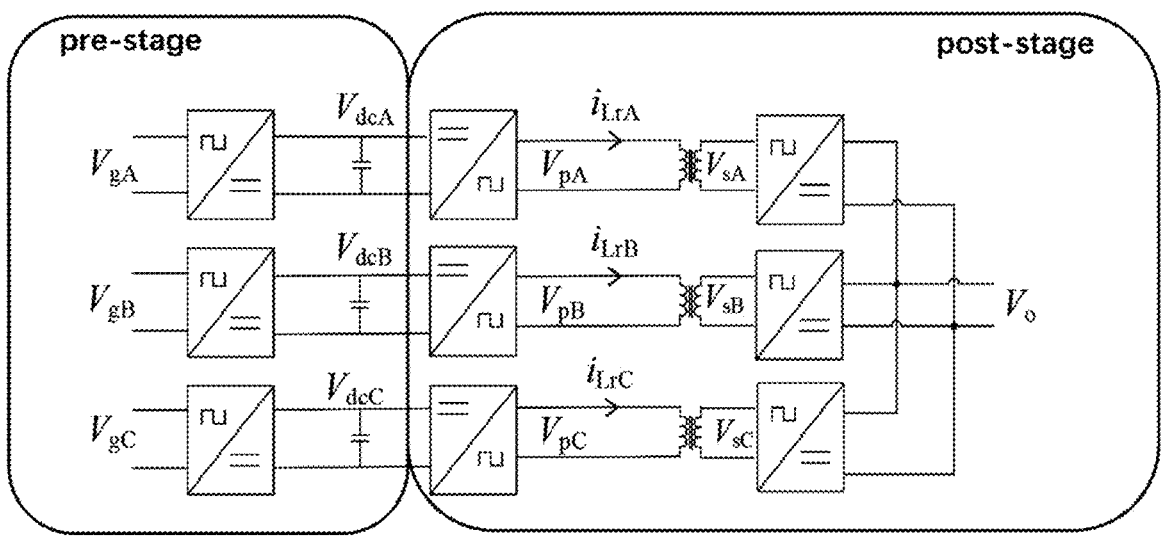
FIG. 10 is a topological diagram of the conventional three-phase solid-state-transformer where the number of modules in each phase is 1.
Figure 11:
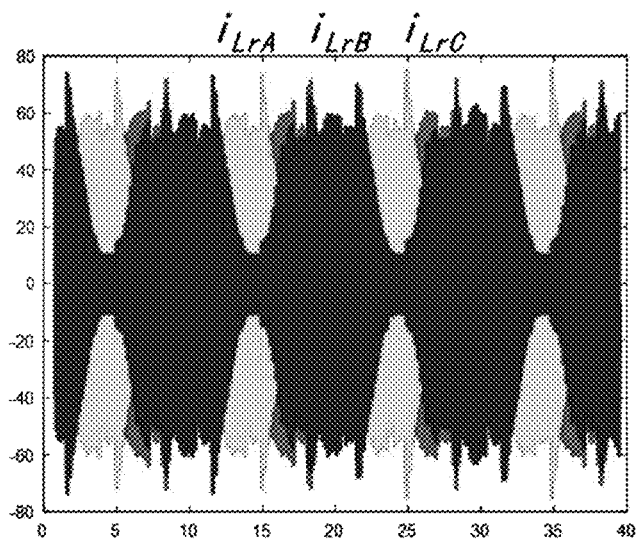
FIG. 11 is a diagram of waveforms when zero-sequence voltage control is performed at the pre-stage in the conventional three-phase solid-state-transformer.

A circuit of the isolating three-phase power module shown in FIG. 2 of the invention is compared with the conventional SST circuit (its topology being shown in FIG. 10) where the number of modules (Cells) of each phase is 1, the pre-stage of the conventional SST circuit also adopts the block diagram of control in FIG. 8, and a diagram of waveforms when zero-sequence voltage control is performed at the pre-stage is shown in FIG. 11. From the comparison between FIGS. 11 and 9B, it can be seen that the structure and the phase-shift control method of the invention, in combination with the interphase voltage-sharing control at the pre-stage, further ensure that resonant currents $i_{LrA}$, $i_{LrB}$ and $i_{LrC}$ of the three phases are completely consistent, while ensuring neither overvoltage nor undervoltage of the DC-Link voltage, thereby realizing automatic current sharing at the post-stage. By contrast, obviously there are double frequency currents in the post-stage circuit in FIG. 11, which affects the efficiency of the post-stage.

The embodiment of the power module provided in the invention is not limited to the embodiment of FIG. 2, and the embodiment of the power system provided in the invention is not limited to the embodiment of FIG. 7, either. Although the embodiment of FIG. 7 illustrates a structure of the three-phase power system 700 comprising three three-phase power modules 71, it can be understood that the structure of the power system provided in the invention is not limited thereto and may comprise at least two power modules. Moreover, output terminals of the at least two power modules may be separate output terminals and may also be connected in parallel to form a common DC output terminal. Input terminals of the at least two power modules may be in cascade connection, or separate input terminals, or in parallel connection, but the invention is not limited thereto.

The high-frequency isolating three-phase power module provided in the invention may be applied to scenarios such as quick charging stations, photovoltaic power stations, data centers, energy storage and microgrids, and the like through the SST formed by cascade connection at the pre-stage. The phase-shift control method for the power module in the invention is not limited to applications of the following listed embodiments.

(1) A Three-Input Non-Isolating High-Frequency Cascaded Power Module

Figure 12:
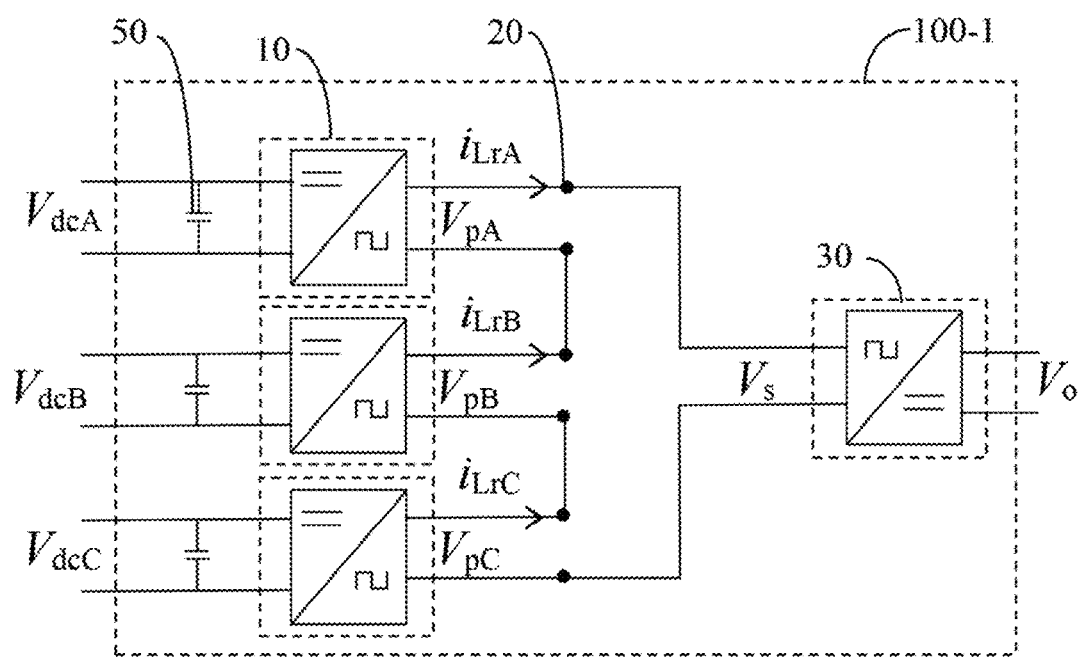
FIG. 12 is a structural diagram when the phase-shift control method of the invention is applied to a non-isolating high-frequency cascaded power module.

The alternative phase-shift control method of the invention may also be applied to a non-isolating high-frequency cascaded power module 100-1, whose topology is shown in FIG. 12. The power module 100-1 in this embodiment differs from the embodiment of FIG. 2 in that does not have an isolation converter, and the respective high-frequency AC terminals 20 are output terminals of the respective inverter units 10 (e.g., the DC-AC circuits). In this embodiment, DC input voltages $V_{dcA}$, $V_{dcB}$, and $V_{dcC}$ pass through the DC-AC circuits so that high-frequency AC voltages $V_{pA}$, $V_{pB}$, and $V_{pC}$ are output, which may be cascaded directly and then connected to the post-stage rectifier circuit 30 (e.g., the post-stage AC-DC circuit) for outputting without passing through the isolation transformer. The topology and the alternative phase-shift control can be applied to a scenario where different batteries or other separate power supplies power to the same load. Through high-frequency cascade connection at the AC side of the inverter circuit and alternative phase-shift control, the power balance between the batteries or power supplies can be ensured.

Figure 13:
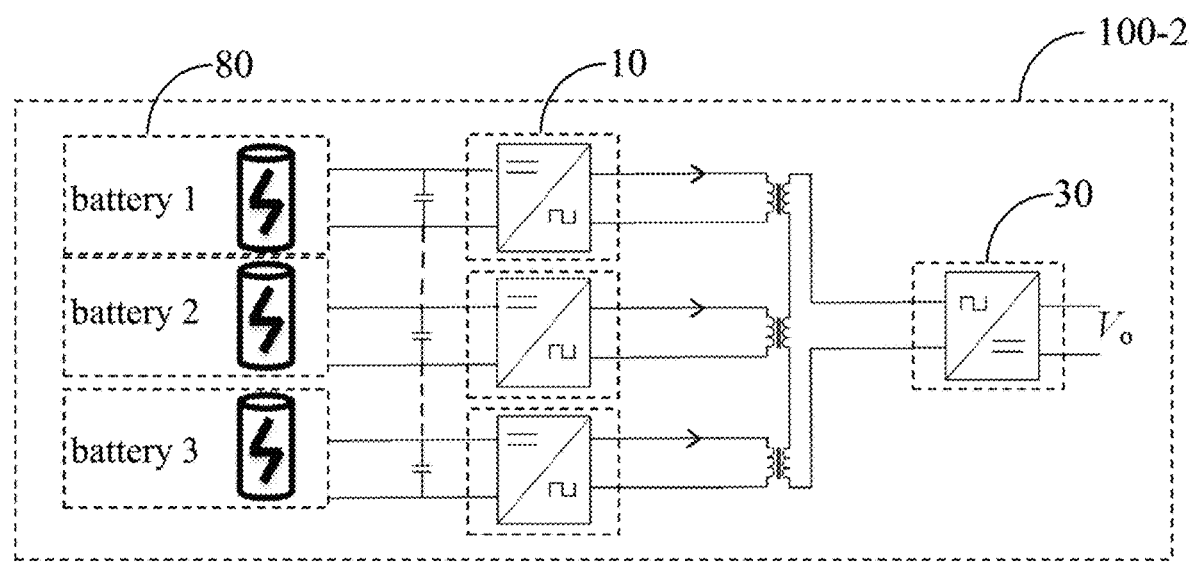
FIG. 13 is a structural diagram of an application embodiment in which the phase-shift control method of the invention is applied to a power device having energy storage batteries.

(2) An Application Embodiment of the Power Module Having Energy Storage Batteries The alternative phase-shift control method of the invention may also be applied to an application embodiment of a power module 100-2 having energy storage batteries, whose topology is shown in FIG. 13. In this embodiment, the power module 100-2 further comprises a plurality of energy storage batteries 80 connected to DC terminals of a plurality of inverter units 10, respectively. Powering the load using the plurality of energy storage batteries 80 can automatically ensure the balance of output powers of the batteries.

(3) An Embodiment of an MVDC-LVDC Conversion System

Figure 14:
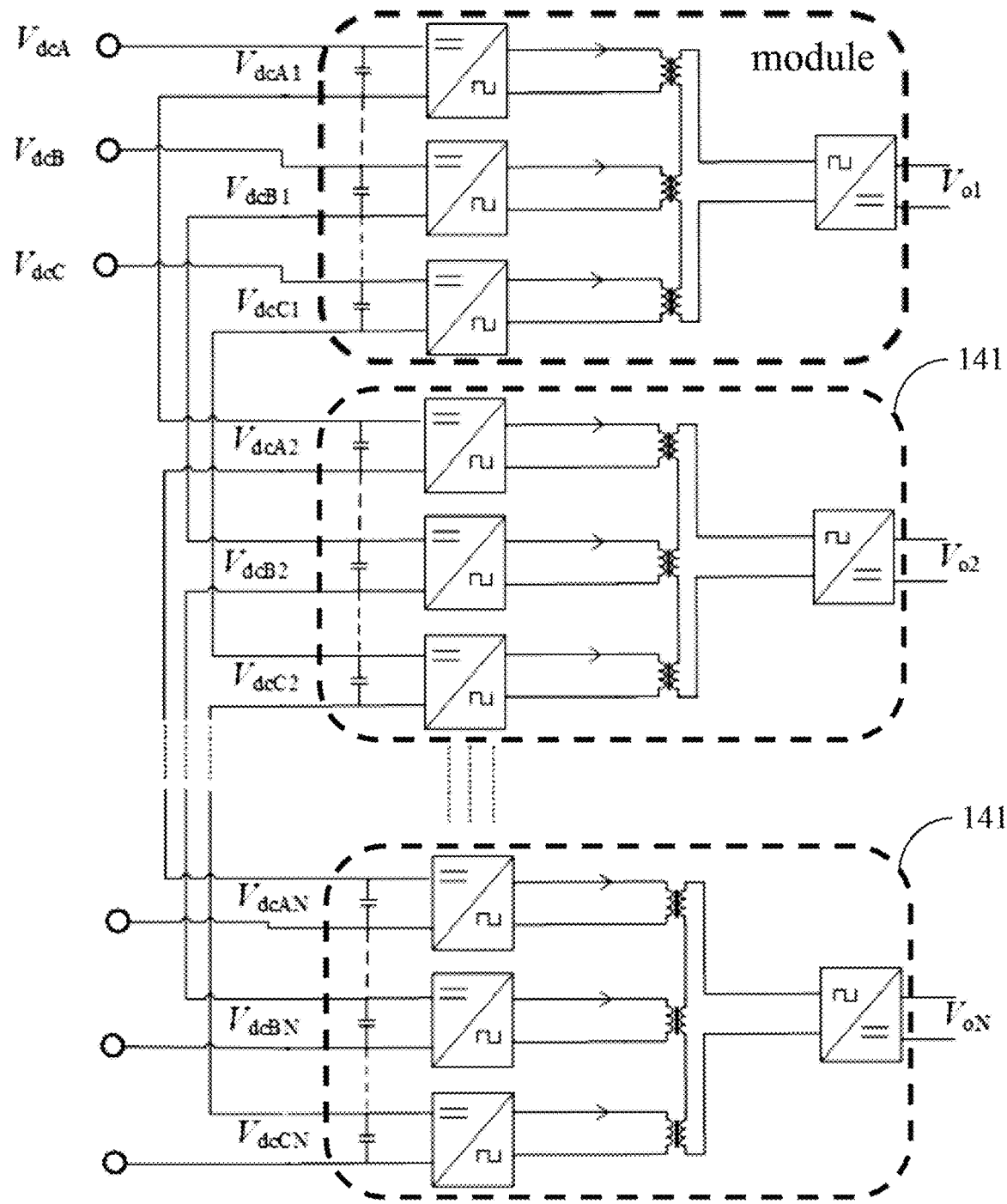
FIG. 14 is a structural diagram in which the phase-shift control method of the invention is applied to a conversion system for converting a high voltage direct current to a low voltage direct current.

The alternative phase-shift control method of the invention may also be applied to a structure of a conversion system for converting a high voltage direct current (HVDC) into a low voltage direct current (LVDC), whose topology is shown in FIG. 14 and can be applied to application scenarios where the HVDC is converted into the LVDC. In this embodiment, the conversion system comprises N power modules 141, corresponding input terminals of all power modules 141 are connected to a three-phase DC power supply after being cascaded, and output voltages of all power modules 141 are independent, such as output voltages $V_{o1}$, $V_{o2}$, . . . , and $V_{oN}$. In other embodiment, outputs of these power modules 141 may also be further connected in parallel to form a common DC bus output. Corresponding inputs of these power modules 141 may also be connected in parallel or be separate, but not limited to cascade connection.

The alternative phase-shift control method applied to high-frequency cascaded modules provided in the invention realizes high-efficiency output and a power-sharing control within a wide range. The invention can inhibit double frequency fluctuation of the DC-Link voltage by injecting a zero-sequence voltage through the pre-stage AC-DC differential mode voltage controller.

The three-phase isolating three-phase power module provided in the invention can offset double frequency fluctuation of a secondary voltage and eliminate the imbalance of currents in a three-phase resonant tank through high-frequency cascade connection of the three phases.

In the SST based on the three-phase isolating three-phase power module provided in the invention, each power module comprises a controller and the controllers are connected by communication lines, thereby reducing the number of modules and the number of controllers.

Exemplary embodiments of the invention have been shown and described in detail. It shall be understood that the invention is not limited to the disclosed embodiments. Instead, the invention intends to cover various modifications and equivalent settings included in the spirit and scope of the appended claims.

What is claimed is:

1. A phase-shift control method for a power module, wherein the power module comprises N inverter units outputting N AC voltages and being coupled to N high-frequency AC terminals respectively, N being a positive integer equal to or greater than 3 and the N high-frequency AC terminals being cascaded and connected to a post-stage rectifier circuit, the phase-shift control method comprises:

setting at least two phase-shift sequences, wherein phase sequence numbers of the N AC voltages of the N inverter units are different in the at least two phase-shift sequences;

in one switching period, controlling the N AC voltages of the N inverter units to phase shift a first angle with each other according to a first phase-shift sequence of the at least two phase-shift sequences; and in another switching period, controlling the N AC voltages of the N inverter units to phase shift the first angle with each other according to a second phase-shift sequence of the at least two phase-shift sequences.

2. The phase-shift control method according to claim 1, wherein each phase-shift sequence lasts at least m switching periods, where m is a positive integer.

3. The phase-shift control method according to claim 1, wherein in controlling phase-shift, N phase-shift sequences are set to control the N AC voltages of the N inverter units to phase shift with each other sequentially and alternatively according to the N phase-shift sequences.

4. The phase-shift control method according to claim 3, wherein in the N phase-shift sequences, each of the inverter units has different phase sequence numbers in the N phase-shift sequences.

5. The phase-shift control method according to claim 1, wherein the power module further comprises N pre-stage rectifier circuits being respectively connected to DC terminals of the N inverter units through an intermediate DC bus capacitor and outputting N pre-stage output voltages to the N inverter units, the phase-shift control method further comprises:
 performing interphase voltage-sharing control on the N pre-stage output voltages.

6. The phase-shift control method according to claim 1, wherein the power module further comprises N energy storage batteries connected to DC terminals of the N inverter units, respectively.

7. The phase-shift control method according to claim 1, wherein the power module further comprises N isolation transformers disposed between the N inverter units and the N high-frequency AC terminals respectively, wherein the N isolation transformers comprise N primary windings connected to the N inverter units and N secondary windings connected to the N high-frequency AC terminals.

8. The phase-shift control method according to claim 7, wherein,
 In controlling phase-shift, the AC voltages at primary sides of the N isolation transformers is phase-shift controlled alternatively.

9. The phase-shift control method according to claim 1, wherein the larger the first angle is, the smaller an output voltage of the post-stage rectifier circuit will be.

10. A three-phase power module, comprising:
 three pre-stage single-phase rectifier circuits having AC terminals electrically coupled to a three-phase AC power supply;
 three intermediate DC bus capacitors;
 three inverter units outputting three AC voltages, wherein the pre-stage rectifier circuits are connected to the inverter units in one-to-one correspondence through the intermediate DC bus capacitors;
 three high-frequency AC terminals coupled to the three inverter units respectively;
 a post-stage rectifier circuit connected to the cascaded three high-frequency AC terminals; and
 a controller configured to perform phase-shift control comprising:
  setting at least two phase-shift sequences, wherein phase sequence numbers of the N AC voltages of the N inverter units are different in the at least two phase-shift sequences;
  in one switching period, controlling the N AC voltages of the N inverter units to phase shift a first angle with each other according to a first phase-shift sequence of the at least two phase-shift sequences; and
  in another switching period, controlling the N AC voltages of the N inverter units to phase shift the first angle with each other according to a second phase-shift sequence of the at least two phase-shift sequences.

11. The three-phase power module according to claim 10, wherein when the controller is performing phase-shift control, three phase-shift sequences are set to control the three AC voltages of the three inverter units to phase shift with each other sequentially and alternatively according to the three phase-shift sequences.

12. The three-phase power module according to claim 11, wherein each phase-shift sequence lasts at least m switching periods, where m is a positive integer.

13. The three-phase power module according to claim 11, wherein,
 in the three phase-shift sequences, each of the inverter units has different phase sequence numbers in the N phase-shift sequences.

14. The three-phase power module according to claim 10, wherein the controller is further configured to perform interphase voltage-sharing control on the three pre-stage output voltages of the three pre-stage rectifier circuits.

15. The three-phase power module according to claim 10, further comprising:
 three isolation transformers disposed between the three inverter units and the three high-frequency AC terminals respectively.

16. The three-phase power module according to claim 15, wherein in phase-shift control, the controller performs alternative phase-shift control on the AC voltages at primary sides of the three isolation transformers.

17. A power system, comprising:
 at least two three-phase power modules according to claim 10.

18. The power system according to claim 17, wherein output terminals of the at least two three-phase power modules are separate output terminals or connected in parallel to form a common DC output terminal.

19. The power system according to claim 17, wherein input terminals of the at least two three-phase power modules are in cascade connection, or separate input terminals, or in parallel connection.

20. The power system according to claim 17, wherein the power system is a three-phase power system comprising three three-phase power modules, and AC sides of the respective pre-stage rectifier circuits in the three three-phase power modules are cascaded and then connected to respective phase of a three-phase AC power supply.

21. The power system according to claim 19, wherein the controllers of each of the three-phase power modules are connected by communication lines.

* * * * *